United States Patent [19]

Fausnight et al.

[11] Patent Number: 5,565,516

[45] Date of Patent: Oct. 15, 1996

[54] FINISHING COMPOSITIONS

[75] Inventors: Ronald L. Fausnight, North Canton; David A. Lupyan, Chagrin Falls; Brian V. Sokol, Westlake; Paul E. Brokaw, Euclid; John R. Nottingham, Hunting Valley; John W. Spirk, Gates Mills, all of Ohio

[73] Assignee: Blue Coral, Inc., Cleveland, Ohio

[21] Appl. No.: 430,335

[22] Filed: Apr. 28, 1995

[51] Int. Cl.$^6$ .................................................. C08L 31/00
[52] U.S. Cl. ............................ 524/556; 524/558; 524/474; 524/476
[58] Field of Search ........................................ 524/556, 558, 524/474, 476

[56] References Cited

U.S. PATENT DOCUMENTS

| | | |
|---|---|---|
| 3,088,158 | 5/1963 | Boyle et al. . |
| 3,331,801 | 7/1967 | Simpson et al. . |
| 3,378,513 | 4/1968 | Witwer ........................... 524/561 |
| 3,518,099 | 6/1970 | Holbus . |
| 3,702,836 | 11/1972 | Walbridge . |
| 3,786,012 | 1/1974 | Marion et al. . |
| 3,847,622 | 11/1974 | Brandl et al. . |
| 3,929,492 | 12/1975 | Chapman et al. . |
| 4,157,973 | 6/1979 | Montillier . |
| 4,347,333 | 8/1982 | Lohr et al. ......................... 524/269 |
| 4,439,343 | 3/1984 | Albanese . |
| 4,673,703 | 6/1987 | Bromley et al. .................. 524/504 |
| 4,703,077 | 10/1987 | Webb . |
| 4,737,537 | 4/1988 | Schwabe et al. . |
| 5,085,695 | 2/1992 | Randon et al. . |

Primary Examiner—Jeffrey T. Smith
Attorney, Agent, or Firm—Calfee, Halter & Griswold

[57] ABSTRACT

A finishing composition for restoring the appearance of the aged, painted surface of an automobile comprises an isobutyl methacrylate resin polymer dissolved in a solvent system comprising a low boiling organic solvent and a high boiling organic solvent.

13 Claims, No Drawings

FINISHING COMPOSITIONS

BACKGROUND OF THE INVENTION

The present invention relates to compositions and processes for restoring the attractive appearance of painted automobile surfaces which have dulled over time.

As an automobile or other vehicle ages, the finish on the vehicle's painted surfaces may become dull and unattractive. This is due to a number of factors affecting the painted surface including wind, weather, sunlight, scratching, abrasion from dirt, dust and other materials, paint oxidation and other adverse chemical reactions. For the purposes of this document, such dulled and unattractive painted automobile or other vehicle surfaces will be referred to hereinafter as "dulled auto finishes".

Many products are available on the market for restoring the appearance of dulled auto finishes. Typically, such products contain a wax, such as carnauba wax, which must be vigorously buffed to develop the desired shiny appearance.

Another product on the market for restoring dulled auto finishes is a conventional car polish. Basically, a car polish is a composition containing an abrasive which, when vigorously rubbed into the dulled auto finish, abrades away the scratches, pitting, oxidized paint and so forth creating the dulling problem.

Still other products available for restoring dulled auto finishes employ combinations of waxes and abrasives to provide the functions of both.

Although both waxes and polishes are effective in restoring dulled auto finishes, they both require significant mechanical effort, specifically rubbing and/or buffing, to be effective. Furthermore, wax coatings wear off comparatively quickly because they are both soft and thin. Furthermore, restoring a car finish by abrasion inherently reduces the thickness of the paint layer without replacing it with some other protective barrier.

Accordingly, it is an object of the present invention to provide a new finishing composition for restoring the appearance of dulled auto finishes which can be applied in a simple and easy manner without rubbing and without buffing.

In addition, it is further object of the present invention to provide such a restorative composition which, when dried, provides a hard, long-lasting protective coating exhibiting a "like new" appearance in terms of color intensity, surface smoothness and gloss.

SUMMARY OF THE INVENTION

These and other objects are accomplished by the present invention which is based on the discovery that a solvent-borne acrylic resin system in which the solvent is composed of a mixture of a specific low boiling organic solvent and a specific high boiling organic solvent, and further in which the acrylic resin includes at least 20% by weight butyl methacrylate, will provide hard, smooth, glossy protective coatings when applied to a dulled auto finish without rubbing or buffing.

Thus, the present invention provides a new type of finishing composition for restoring the appearance of dulled auto finishes, the composition comprising a solution of a thermoplastic acrylic resin containing at least 20 weight percent polymerized butyl methacrylate in a solvent system comprising a low-boiling organic solvent having a kauri-butanol value of about 25 to 45 and a vapor pressure of 0.5 to 6.0 mm Hg at 20° C. and a high-boiling organic solvent having a vapor pressure no higher than about 1 mm Hg at 20° C.

In accordance with the present invention, it has been found that such compositions will inherently meter themselves onto dulled auto finishes regardless of orientation in a substantially uniform manner and thereafter dry into continuous, transparent, protective coatings exhibiting a high degree of surface smoothness and hence gloss over a large surface area, for example, 1 square foot (about 0.1 m$^2$) or more. Thus, it is possible to restore the attractive, high-gloss surface finish of older automobiles to, or at least approaching, "like-new" appearance by simply applying the inventive finishing composition thereto and allowing the composition to dry without the vigorous rubbing or buffing necessary with prior art products.

In another aspect of the present invention, a unique applicator is also provided for applying the inventive finishing compositions to dulled auto finishes. This applicator is composed of a flexible, open-celled sponge having a density of 3 to 9 pounds per cubic foot, a tensile strength of 25 to 45 psi and a percent elongation of 50 to 800%. In addition, this applicator is configured to define at least one straight edge measuring at least 3 inches (about 7.6 cm). In accordance with the present invention, it has been found that use of this unique applicator enables the inventive finishing composition to be applied to dulled auto finishes with a minimum of "brush strokes" being created in the incipiently-formed liquid coating. This, in turn, promotes formation of dried coatings which are smooth and glossy, because the amount of leveling the liquid layer must undergo before drying is minimized.

DETAILED DESCRIPTION OF THE INVENTION

The inventive finishing composition comprises a solution of a particular acrylic resin in a particular organic solvent system.

The acrylic resins which are useful in accordance with the present invention comprise thermoplastic polymers and copolymers which contain at least 20 weight percent polymerized butyl methacrylate therein and further which will dissolve in the particular low-boiling organic solvent also used in the inventive finishing composition.

Solvent-borne acrylic resins are known to provide hard, glossy, transparent protective coatings on a variety of different substrates by simple application of the composition followed by drying. Acrylic floor waxes are good examples of these products. However, such materials cannot be used to restore the shine and appearance of dulled auto finishes, at least in a commercially viable manner, for a variety of reasons.

For example, the durability of a protective coating formed from a typical solvent-borne acrylic resin system is insufficient to keep a restored automobile surface in its desired glossy condition for any reasonable length of time. Restorative coatings on automobile surfaces are subjected to the same elements of wind, weather, scratching, dust, dirt and sunlight causing dulling of the original finish, and most solvent-borne acrylics will not withstand these elements for any significant length of time.

Second, it is very difficult to form protective coatings with the high degree of surface gloss needed to restore the beauty and shine of a dulled auto finish to, or at least approaching, a "like-new" appearance. In many applications where solvent-borne acrylic resins are used to form protective coatings, for example floor waxes or cement coatings, the surface of the substrate itself is not uniform in terms of smoothness and therefore the protective coating, when applied, need not exhibit a high degree of uniformity when dried, at least over a large surface area. In applications involving a painted auto panel, however, the panel itself is smooth over a comparatively large area, e.g. one square foot (about 0.1 m² or more), and therefore its painted surface must exhibit a high degree of surface smoothness over this entire area to develop the desired glossy appearance. Most solvent-borne acrylic resin systems are incapable of drying to form protective coatings with this degree of surface smoothness, at least over areas this large in size.

Still another major impediment to the commercial use of typical solvent-borne acrylic resin systems as restoratives for auto finishes relates to the toxic nature of the solvents used in these compositions. The primary market for car finish restoratives is the private individual who will apply the restorative by hand. Many solvent-borne acrylic resin systems use solvent systems which are toxic or at least detrimental to health and therefore cannot be used as a practical matter.

In accordance with the present invention, it has been found that these disadvantages can be overcome by using a specific solvent system as described below as well as a thermoplastic acrylic resin system which is both soluble in the low-boiling organic solvent used in this solvent system and which also contains at least 20 weight percent butyl methacrylate polymerized therein.

In these thermoplastic acrylic resins, any of the three isomers of butyl methacrylate can be used. However, isobutyl methacrylate and tertiary-butyl methacrylate are preferred, while isobutyl methacrylate is particularly preferred. Also, these acrylic resins can include other copolymerized comonomers such as acrylic acid, methacrylic acid, the $C_1-C_{12}$ alkyl esters of acrylic acid and methacrylic acid (particularly the methyl, ethyl and 2-ethylhexyl esters of acrylic acid and methacrylic acid as well as butyl acrylate and especially methyl methacrylate), benzol methacrylate, 2-hydroxyethylacrylate, 2-hydroxyethylmethacrylate, 2-hydroxypropylacrylate, 2-hydroxypropylmethacrylate, acrylonitrile, methacrylonitrile, acrylamide, methacrylamide, vinyl esters of organic and inorganic acids such as vinyl acetate, vinyl propionate, vinyl chloride and vinylidene chloride, vinyl aromatic compounds such as styrene, vinyl toluene and hydrocarbon monomers such as isoprene and butadine, and so forth.

Preferred acrylic resins are those which are composed substantially completely of the acids and esters of acrylic acid and methacrylic acid. Of these, even more preferred are those which contain a predominant amount of copolymerized isobutyl methacrylate. These acrylic resins may also contain a small amount of hydroxyl functionality, carboxyl functionality or both to facilitate cross-linking with optionally included cross-linking agents capable of forming ionic linkings with these functionalities.

In addition, it is also preferred that the acrylic resins used in the present invention be soluble in conventional aliphatic solvents such as mineral thinner such as those meeting ASTM D-235, Type 1. In addition, it is also preferred that these resins when in a bulk state exhibit a glass transition temperature, Tg° C., of 40° to 90° C. and, in addition, when cast onto smooth surfaces from organic solvents, produce films with a Tukon hardness, Khn, of from 6 to 20, preferably 9 to 15.

A particularly preferred acrylic resin is known in the art as Acryloid®B-67, which is a proprietary product of Rohm & Hass Corporation of Philadelphia, Pa. This resin is believed to be a homopolymer of isobutyl methacrylate having a molecular weight of less than 10,000. It exhibits a glass transition temperature, Tg, of about 50° C. and a Tukon hardness, Khn, when formed into a film, of about 11–12. This material can be obtained either in solid form or in the form of a concentrated solution in mineral thinner, which in turn is known in the art as Acryloid® B-67 MT.

The amount of acrylic resin contained in the inventive finishing compositions can vary widely and essentially any amount can be used as long as it remains dissolved in the organic solvent system of the inventive finishing composition. Preferably, the amount of acrylic resin in the inventive finishing composition is maintained between about 5 to 50 weight percent, preferably about 8 to 35 weight percent, based on the total weight of the composition. Most preferably, the acrylic resin content is about 12 to 18 weight percent.

The solvent system employed in the inventive finishing composition is composed of a mixture of a low-boiling organic solvent and a high-boiling organic solvent. The low-boiling organic solvent dissolves the acrylic resin and acts as a vehicle or carrier allowing the acrylic resin to be applied to the surface to be coated in a uniform manner. Accordingly, the low-boiling solvent must have a high enough solvency to dissolve the acrylic polymers employed. On the other hand, the solvency of the low-boiling organic solvent cannot be so great that it dissolves the paint on the surface it is intended to restore to any significant degree. Accordingly, it is preferable that the low-boiling solvent employed in the inventive finishing composition have a solvency, as measured in terms of kauributanol value, of no lower than about 25 and no higher than about 45, preferably 30 to 45, more preferably about 32 to 38. Kauri-butanol value is a well known measure of the solvency power of organic solvents and is described, for example, in ASTM D-113.

A second important feature of the low-boiling organic solvents employed in the inventive finishing compositions is their volatility. For best results, these low-boiling solvents should have a vapor pressure of about 0.5 to 6, preferably 0.8 to 4.0, more preferably 1 to 2.5, mm Hg. at 20° C. In the preferred finishing compositions of the present invention, substantially all of the low-boiling solvent should evaporate within about 10 to 60, preferably 15 to 30 minutes. In general, this translates to the low-boiling organic solvent having a boiling point, or more typically a boiling point range, of from about 150° to 250° C. (about 300° to 480° F.), more typically about 150° to 200° C. (about 300° to 390° F.).

Many different commercially available materials meet the foregoing requirements. For example, conventional mineral spirits or mineral thinner, kerosene, terpines, chlorinated organic solvents and certain dearomatized aliphatic hydrocarbon solvents such as those sold by Exxon Chemical Company of Houston, Texas, under the designation EXXSOL® are examples of low-boiling organic solvents which can be used.

A preferred low-boiling organic solvent is mineral spirits, particularly Type I mineral spirits or thinner, meeting ASTM D235 (Stoddard Solvent). This material is composed of roughly half paraffins and half aromatics and napthenes and exhibit initial boiling points of roughly 140° to 170° C. (about 290° to 340° F.), final boiling points of no higher than about 205° C. (about 400° F.) and solvencies, measured as kauri-butanol values, of approximately 25 to 45, more particularly about 30 to 40.

The amount of low-boiling solvent included in the inventive finishing compositions is not critical, although it should be enough to keep the acrylic resins in solution during storage and application. Typically, the low-boiling organic solvent will be present in an amount of at least about 50 weight percent of the composition up to a maximum amount of about 90 weight percent. Preferred concentrations for the low-boiling organic solvent are 55 to 75 weight percent, more preferably 60 to 65 weight percent.

The second component of the solvent system used in the inventive finishing compositions is the organic high-boiling solvent. As in the case of a low-boiling solvent, an important characteristics of the high-boiling solvent is its volatility.

The purpose of the high-boiling solvent is not to dissolve the acrylic resin itself but rather to keep the inventive finishing composition sufficiently fluid so that it will "flow" to a layer of uniform thickness under the influence of its own weight and surface tension after it has been applied to the surface to be restored.

In this connection, when the inventive finishing composition is applied with an applicator such as a brush or cloth or sponge, the layer formed will inherently be non-uniform in thickness and surface appearance from the "brush strokes" produced by the action of the applicator. Because the low-boiling solvent tends to evaporate relatively rapidly, these brush strokes can remain in the acrylic resin layer when dried. The high-boiling solvent prevents this from occurring in that the high-boiling solvent keeps the applied layer of acrylic resin fluid enough during and after the majority of the low-boiling solvent evaporates so that it will "flow" or "level" to a layer of uniform thickness under its own weight and surface tension.

Accordingly, it is important that the high-boiling solvents used in the present invention have a relatively low vapor pressure, i.e. lower than about 1.0 mm Hg at 20° C., preferably 0.5 mm Hg at 20° C. or less. More preferred high-boiling solvent have vapor pressures of less than 0.3, more preferably less than 0.1 mm Hg at 20° C. In the preferred high-boiling solvents, this translates to a boiling point range of roughly 250° C. to 315° C. (480° to 600° F.), although solvents with other boiling point ranges can be employed.

The solvency of the high-boiling solvent is not critical and high boiling solvents of any solvency power can be employed. Indeed, in the preferred embodiment of the invention, the particular high-boiling solvents used have little or no solvency for the acrylic resins in the system. As in the case of the low-boiling solvent, however, the solvency of the high-boiling solvent should not be so high that substantial dissolution of the finish to be restored occurs. Preferably, they should not have a kauri-butanol value above about 45.

Many different organic solvents are available commercially which satisfy the foregoing requirements. For example, a range of white mineral oils and normal paraffins fall within these specifications. Specific examples of useful high boiling solvents are:

| High Boiling Solvent | K-B Value | Vapor Pressure (mm Hg at 20° C.) |
| --- | --- | --- |
| Isopar M | 27 | 0.1 |
| Isopar V | 25 | <0.1 |

-continued

| High Boiling Solvent | K-B Value | Vapor Pressure (mm Hg at 20° C.) |
| --- | --- | --- |
| Kerosene | 34 | 0.4 |
| 460 Solvent | 32 | 0.23 |
| Mineral Seal Oil | 27 | <0.1 |
| Witco PD-23 | 25.5 | 0.01 (at 24°C.) |
| Witco PD-25 | 23.5 | 0.005 (at 24° C.) |
| Chemcentral 140 Solvent 66 | 30 | 0.5 |

A particularly preferred class of high-boiling organic solvents useful for the present invention is the synthetically produced isoparaffinic solvent available from Exxon Chemical Company of Houston, Tex. under the designation "Isopar V." This material is a highly aliphatic synthetically produced organic solvent containing approximately 50% isoparaffins and having a vapor pressure at 38° C. of about 0.3 mm Hg as determined by ASTM D2879, a high aniline point (93° C., 199° F.) and a kauributanol value of about 25.

The amount of high-boiling solvent that can be included in the inventive finishing compositions can also vary widely. Typically, the inventive finishing compositions will contain about 1 to 20 weight percent high-boiling solvent, although amounts on the order of 2 to 10 percent, more preferably 3 to 5% are preferred. Basically, the amount of high-boiling organic solvent to use in a particular formulation depends on the concentration of the acrylic resin as well as the identity of the low-boiling organic solvent and can be easily determined by routine experimentation.

Also, while any high boiling solvent as described above can be used with any low boiling solvent, it is preferred that the high boiling and low boiling solvents selected for a particular application be such that the ratio of the vapor pressures of the low and high boiling solvents, measured in terms of mm Hg at 20° C., be at least 10 to 1. It should also be appreciated that both the low and the high boiling solvents used in a particular formulation are preferably chosen with respect to the ambient conditions expected during product use. Specifically, higher vapor pressure (faster evaporating) solvents are used for cooler climates while lower vapor pressure (slower evaporating) are used for warmer clients. It should also be appreciated that for any given formulation the ratio of the high boiling solvent to the low boiling solvent can be adjusted to regulate drying time. For example, the formula using 4% Isopar V has been found effective at a temperature range of 50° to 80° F. Performance may be enhanced in warmer climates by increasing the Isopar V to 6% and reducing the mineral spirit content to a corresponding amount.

In addition to the foregoing components, the inventive finishing composition can also contain other components to improve performance. For example, various types of nonionic surfactants can be included in the invention finishing composition for this purpose. Nonionic surfactants serve to improve the chemical affinity (i.e. promote "wetting") of the inventive finishing compositions for dulled auto finishes, which often contain trace amounts of fugitive moisture. This in turn facilitates flow and leveling of the inventive finishing compositions and thereby leads to enhanced slip, mar resistance and gloss in the final dried coating produced when the inventive finishing composition dries.

Although any type of non-ionic surfactant can be employed, those having an HLB of 2 to 15 are preferred. Also, particularly preferred are those which contain dimethylpolysiloxane.

For example, especially preferred surfactants comprise copolymers of polydimethylsiloxane and polyethylene oxide or polyproylene oxide. Examples of such surfactants are the silicone glycol polymers, especially those manufactured by Dow Corning Corporation of Midland Michigan and sold under the designation Dow Corning® 28 Additive and Dow Corning® 29 Additive. Dow Corning® 28 Additive is a silicone/glycol polymer in which the glycol is of the polyethylene oxide type whose functionality is primarily carbinol. Dow Corning® 29 Additive is a silicone/glycol polymer in which the glycol is of polyethylene oxide type whose functionality is primarily hydroxyl.

Another example of a particularly useful nonionic surfactant based on polydimethylsiloxane is polyester-modified polydimethylsiloxanes in which the functionality is primarily hydroxyl. A surfactant sold by BYK Chemie' of Wallingford, Mass. under the designation BYK-370 is an example of this type of surfactant.

Mixtures of the above surfactants, especially mixtures of the above polydimethylsiloxane-based surfactants are particularly preferred in accordance with the present invention.

Any amount of nonionic surfactant can be employed in the inventive finishing compositions. Typically, the amount employed will be sufficient to improve wettability of the dulled auto finish with the invention finishing composition, while amounts higher than a total of about 5 weight percent will produce no additional improvement. Normally, surfactant amounts of 0.01 to 2 weight percent, more preferably 0.05 to 1.0 weight percent, are appropriate. If both polyester-modified and polyethylene oxide or polypropylene oxide-modified polymethylsiloxane surfactants are employed, the maximum amount of polyester modified surfactant should be on the order of about 2 weight percent while the maximum amount of the polyethylene oxide or polypropylene oxide-modified surfactant should be no more than about 3 weight percent.

Still another additive which has been found to be beneficial in the inventive finishing compositions is a Cross-linking agent capable of cross-linking through the formation of ionic bonds, hereinafter referred to as an "ionic cross-linking agent." Preferred acrylic resins used in the inventive finishing compositions contain carboxyl or hydroxyl moieties which will react with such cross-linking agents through the formation of ionic bonds. In any event, it has been found that by incorporating a small but suitable amount of an ionic cross-linking agent in the finishing compositions of the present invention, the mar resistance, durability and water resistance of the protective films formed from the inventive finishing compositions will also be improved.

Any type of ionic cross-linking agent which can be uniformly dispersed or dissolved in the other ingredients of the inventive finishing compositions can be used for this purpose. For example, cross-linking agents (referred to as "maturation agents") useful in the manufacture of unsaturated polyester resins such as, for example, compounds having two or more pendant isocyanates moieties, can be used for this purpose. Preferred, however, are organic compounds having multiple amino groups for providing the ionic functionality. Especially preferred are silicone fluids (dimethylpolysiloxane fluids) having the amino functionality. Specific examples of such compounds are the amino functional silicone fluids sold by the Dow Corning Corporation of Midland, Mich. under the designation Dow Corning® 531 and Dow Corning® 536. Mixtures of these cross-linking agents are particularly preferred.

The above preferred ionic cross-linking agents are known to enhance the performance of various detergent-resistant auto polishes in which waxes and other low molecular weight ingredients are used to provide a protective layer on the surface to be treated. In accordance with the present invention, it has been found that these materials will also improve the properties of the finishing compositions of the present invention, both in terms of surface smoothness and gloss as well as hardness and mar resistance.

If used, sufficient ionic cross-linking agent should be included to improve durability and shine of the final protective coating produced. Typically this means that the amount of cross-linking agent should be between greater than 0 to 4 weight percent, more typically between 0.01 and 1.0 weight percent, more preferably about 0.08 to 0.5 weight percent.

The inventive finishing compositions are water white (i.e. transparent) in appearance and typically have viscosities of 3 to 15, preferably 5 to 10, centipoise. They can be applied in a variety of different ways such as by spraying, pouring the liquid composition onto the surface to be protected and then spreading it evenly on the surface with an applicator, or by applying the liquid to an applicator and thereafter wiping the applicator on the surface to be protected. In a preferred embodiment of the invention, a unique applicator is provided to apply the inventive finishing compositions in precisely the right manner. In this preferred embodiment, this unique applicator comprises a flexible, open cell polymer sponge having a gross density of 3 to 9, preferably 4 to 8, pounds per cubic foot, a tensile strength of 25 to 45, preferably 30 to 40, psi and a percent elongation of 50 to 800%. In addition, this applicator should also have at least one straight edge at least 3 inches (7.6 cm) long to allow the applicator to be used as a squeegee for pushing the inventive finishing composition along the surface to be protected. Most preferably, the inventive applicator is in the form of a rectangular block.

The unique sponge product of the present invention can be made from any material such as latex, cellulose, polyester and polyurethane. Preferably, this sponge is made from a material which has a little or no solubility in the solvent system of the finishing composition of the present invention so that it does not substantially dissolve in use.

In developing the present invention, many different techniques were tried for applying the inventive, and related, finishing compositions to dulled auto finishes. A problem encountered with most hand applicators, that is applicators which spread the finishing composition on the surface to be protected by wiping or light rubbing, is that they leave brush strokes of considerable size in the liquid layer being deposited. In order that the final protective layer produced have the extreme "high area" surface smoothness required to produce the desired glossy finish, these brush strokes must be eliminated by the inherent tendency of the liquid composition applied to flow or level into a layer of uniform thickness and surface smoothness. Where the brush strokes produced by the applicator are larger, i.e. where the distance between the peaks and the valleys in these brush strokes is greater, greater flow or movement must be done by the material to reach a uniform thickness and surface finish. The inventive applicator, however, because of its porosity, flexibility, and relative surface smoothness can mechanically lay down a layer of finishing composition with comparatively small brush strokes in terms of the distance between the brush stroke peaks and valleys and thereby minimize the "flow" or leveling action that must be accomplished by the composition itself. At the same time, because of its flexibility and hardness, it is still possible with the inventive applicator to rub the inventive finishing composition into the microscopic pores, cracks and fissures in the surface to be protected, thereby aiding any wetting of the surface to be protected. Also, because of its flexibility the inventive applicator also is able to follow the contour of the panel to be restored, even if convoluted in shape while at the same time the square edge of the applicator promotes a certain squeegee action allowing excess composition to be pushed along and thereby spread around on the surface in a uniform manner.

The unique applicator of the present invention works best with the novel finishing compositions of this invention. Indeed, the combination of the inventive applicator and the inventive finishing composition provides a restoration system which is capable of restoring dulled auto finishes to a condition approaching a "like new" appearance in terms of surface smoothness, color intensity and gloss. Moreover, this result is accomplished on a wide variety of different dulled auto finishes, even though made from many different paint systems on vehicles made by many different automobile manufacturers, both foreign and domestic. In any event, the applicator of the present invention can also be used to apply other solvent-borne acrylic resin systems to dulled auto finishes so long as these acrylic resin systems have viscosities of 3 to 30 centipoise. This is because the inherent benefit of substantially reducing incipient brush strokes made possible with the inventive applicator is realized without regard to the specific chemical identity of the acrylic resin and solvent system employed.

Although the present invention has been thoroughly described above, the following working example is presented to more thoroughly illustrate the present invention.

EXAMPLE

A finishing composition in accordance with the present invention was formed by mixing the following ingredients in the order indicated. Mixing was accomplished for approximately 30 minutes to produce the final product.

| Ingredient | Amount, Wt. % |
| --- | --- |
| Mineral Spirits (Sun Petrochemical Company, Toledo, Ohio) | 62.5 |
| Low-boiling solvent (Isopar V) | 4.0 |
| Isobutyl methacrylate acrylic resin (Acryloid ® B67-MT and containing 45 wt. % solids, 55 wt. % mineral thinner) | 33.0 |
| Hydroxyl-functional silicone glycol copolymer surfactant (Dow Corning 29) | 0.1 |
| Carbinol-functional silicone glycol copolymer surfactant (Dow Corning 28) | 0.1 |
| Polyester modified siloxane (BYK370 available from BYK Chemie') | 0.1 |
| Amino-functional polydimethylsiloxane copolymer cross-linking agent (Dow Corning 536) | 0.03 |
| Amino-functional polydimethylsiloxane copolymer cross-linking agent (Dow Corning 531-50 wt. % solids, 50 wt. % aliphatic solvents and isopropyl alcohol) | 0.17 |

Various portions of the foregoing composition were applied to various different painted sections of older automobiles in which the painted surfaces had dulled considerably. Application was done by means of an open cell flexible sponge measuring 5 ½×2×1 inches (13.5×5×2.5 centimeters) made from polyurethene and having a tensile strength of 35 psi and a bulk density of 6 lb/ft. In each instance, the finishing composition was applied by wiping the area to be protected with the finishing composition with only a few strokes and no buffing or other working. The finishing composition was then allowed to dry for about 15 to 30 minutes after which the protective coatings so produced were examined.

In every instance, a surface finish of high gloss with intense color was produced, the so-treated panels appearing to exhibit a "like-new" appearance.

Although only a few embodiments of the present invention have been described above, it should be appreciated that many modifications can be made without departing from the spirit and scope of the invention. All such modifications are intended to be included within the scope of the present invention, which is to be limited only by the following claims.

We claim:

1. A finishing composition for restoring the appearance of an aged, painted surface of an automobile or other vehicle, said composition comprising
   (1) a solvent system comprising a solution of
      (a) a major amount of a low-boiling organic solvent, said low-boiling organic solvent having a kauributanol value of about 25 to and a vapor pressure at 20° C. of 0.5 to 6.0 mm Hg., and
      (b) a minor amount of a high-boiling organic solvent having a vapor pressure of no higher than about 1.0 mm Hg. at 20° C., and
   (2) an acrylic resin dissolved in such solvent system, said acrylic resin containing at least 20 weight percent polymerized butyl methacrylate therein.

2. The composition of claim 1 wherein, said acrylic resin contains a predominant amount of copolymerized isobutyl methacrylate and further wherein the vapor pressure of said high boiling organic solvent is less than about 0.5 mm Hg at 20° C.

3. The composition of claim 2, wherein said acrylic resin is composed substantially completely of the acids and esters of acrylic acid and methacrylate acid.

4. The composition of claim 3, wherein said acrylic resin contains sufficient groups selected from the group consisting of hydroxyl groups and carboxyl functionality to improve in the mar resistance of dried polymer layers formed from said composition when cross-linked.

5. The composition of claim 4, wherein said composition further contains an ionic cross-linking agent in an amount sufficient to improve the mar resistance of dried polymer layers formed from said composition.

6. The composition of claim 5, wherein said composition further contains a nonionic surfactant.

7. The composition of claim 1, wherein said composition contains
   (a) 5 to 50 wt. % of an acrylic resin containing greater than 50 wt. % polymerized isobutyl methacrylate,
   (b) 50 to 90 wt. % of a low boiling organic solvent having a kauri-butanol value of 25 to 45 and a vapor pressure of about 0.5 to 6.0 mm Hg at 20° C.,
   (c) 1 to 20 wt. % of a high boiling organic solvent having a vapor pressure of 0.5 mm Hg or less at 20° C., said low boiling solvent and said high boiling solvent being further selected so that the ratio of the vapor pressures of said low and high boiling solvents, measured in terms of mm Hg at 20° C., is at least 10 to 1,
   (d) a sufficient amount of a nonionic surfactant to improve wetting of said composition when said composition is applied to a dulled auto finish, and
   (e) a cross-linking agent capable of cross-linking an acrylic resin through formation of ionic linkages in an amount sufficient to improve the durability of dried films produced from said composition when deposited on a dulled auto finish.

8. The composition of claim 7 wherein said composition contains no more than about 5 wt. % nonionic surfactant and no more than about 4 wt. % cross-linking agent.

9. The composition of claim 8 wherein said composition contains
- (a) about 8 to 35 wt. % of an acrylic resin composed substantially completely of the acids and esters of acrylic acid and methacrylate acid,
- (b) about 55 to 75 wt. % of a low-boiling organic solvent having a kauri-butanol value of about 30 to 45, and a vapor pressure of 0.8 to 4.0 mm Hg at 20° C.,
- (c) about 2 to 10 wt. % of a high-boiling organic solvent having a vapor pressure of less than 0.3 mm Hg at 20° C.,
- (d) about 0.01 to 2.0 wt. % of at least one ionic surfactant containing polydimethylsiloxane; and
- (e) about 0.01 to 2.1 wt. % of an amino-functional cross-linking agent.

10. The composition of claim 9 wherein said composition comprises
- (a) about 12 to 18 wt. % of an acrylic resin compound substantially completely of isobutyl methacrylate, said resin having a molecular weight of less than 10,000,
- (b) about 60 to 65 wt. % of a low-boiling organic solvent having a kauri-butanol value of about 32 to 38 and a vapor pressure of at least 1.2 mm Hg at 20° C., and
- (c) about 3 to 5 wt. % of a high-boiling organic solvent having a vapor pressure of no higher than about 0.1 mm Hg at 20° C.

11. The composition of claim 10 wherein said acrylic resin is a homopolymer isobutylmethacrylate having a molecular weight of no higher than about 10,000, said low-boiling organic solvent is mineral spirits, wherein said high-boiling organic solvent is a synthetic isoparaffinic solvent containing approximately 50 wt. % isoparaffins and having a vapor pressure at 38° C. of about 0.3 mm Hg and a kauri-butanol value of about 25, wherein said nonionic surfactant comprises a mixture of a polyester modified polydimethylsiloxane, a polyethylene oxide/polydimethylsiloxane copolymer having hydroxyl groups and a polyethylene oxide/polydimethylsiloxane copolymer having carbinol functionality, and wherein said cross-linking agent is an amino-polydimethylsiloxane.

12. A process for improving the appearance of a dulled auto finish comprising applying the composition of claim 1 thereto.

13. The process of claim 12 wherein said composition comprises
- (a) about 8 to 35 wt. % of an acrylic resin composed substantially completely of the acids and esters of acrylic acid and methacrylate acid,
- (b) about 55 to 75 wt. % of a low-boiling organic solvent having a kauri-butanol value of about 30 to 45, and a vapor pressure of 1.0 to 4.5 mm Hg at 20° C.,
- (c) about 2 to 10 wt. % of a high-boiling organic solvent having a vapor pressure of less than 0.5 mm Hg at 20° C.,
- (d) about 0.01 to 2.0 wt. % of at least one ionic surfactant containing polydimethylsiloxane; and
- (e) about 0.01 to 2.1 wt. % of an amino-functional cross-linking agent.

\* \* \* \* \*

UNITED STATES PATENT AND TRADEMARK OFFICE
CERTIFICATE OF CORRECTION

PATENT NO.  : 5,565,516
DATED       : October 15, 1996
INVENTOR(S) : Fausnight et al.

It is certified that error appears in the above-indentified patent and that said Letters Patent is hereby corrected as shown below:

Claim 1, Column 10, Line 21, After "about 25 to" please insert --45--

Signed and Sealed this

Seventeenth Day of December, 1996

Attest:

BRUCE LEHMAN

Attesting Officer       Commissioner of Patents and Trademarks